US009868273B2

(12) United States Patent
Sung et al.

(10) Patent No.: US 9,868,273 B2
(45) Date of Patent: Jan. 16, 2018

(54) PRESSURE-SENSING STAGES FOR LAMINATION SYSTEMS

(71) Applicant: LG Display Co., Ltd., Seoul (KR)

(72) Inventors: Kuo-Hua Sung, San Jose, CA (US); Yong-Soo Kim, Paju-Si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/897,074

(22) PCT Filed: Sep. 20, 2013

(86) PCT No.: PCT/US2013/061031
§ 371 (c)(1),
(2) Date: Dec. 9, 2015

(87) PCT Pub. No.: WO2015/041688
PCT Pub. Date: Mar. 26, 2015

(65) Prior Publication Data
US 2016/0136937 A1    May 19, 2016

(51) Int. Cl.
*B32B 37/10*   (2006.01)
*B32B 41/00*   (2006.01)
*B30B 15/22*   (2006.01)

(52) U.S. Cl.
CPC .......... *B32B 37/1009* (2013.01); *B30B 15/22* (2013.01); *B32B 41/00* (2013.01); *B32B 2457/202* (2013.01)

(58) Field of Classification Search
CPC ............ B32B 2309/12; B32B 2309/70; B32B 2309/72; B32B 37/1009; B32B 41/00; B32B 2457/202; B30B 15/22
(Continued)

(56) References Cited
U.S. PATENT DOCUMENTS

2003/0056725 A1    3/2003  Ueyama et al.
2003/0168176 A1    9/2003  Byun et al.
(Continued)

FOREIGN PATENT DOCUMENTS

CN    1448768 A    10/2003
CN    1796105      7/2006
(Continued)

OTHER PUBLICATIONS

Translation of JP 09-281458 A. Oct. 31, 1997. Toshiba Corp.*
(Continued)

*Primary Examiner* — George Koch
(74) *Attorney, Agent, or Firm* — Fenwick & West LLP (57) ABSTRACT

A lamination system (110) may be provided for attaching together display layers (45,46) for an electronic device display. The system may include one or more pressure-sensing lamination stages (124, 126) for temporarily mounting the display layers during lamination operations. A pressure-sensing lamination stage (124) may include one or more pressure sensors (130) configured to sense pressures that are applied to the display layers during lamination operations. The pressure-sensing lamination stages may include a fixed mounting stage (126) and a movable mounting stage (124). The movable mounting stage may be moved so that a first set of display layers is pressed against a second set of display layers to attach the first and second sets of display layers. The pressure with which the first set of display layers (45;46) is pressed against the second set of display layers may be adjusted based on pressure data gathered using the pressure sensors (130).

19 Claims, 10 Drawing Sheets

(58) Field of Classification Search
USPC .......................................... 156/64, 358, 367
See application file for complete search history.

(56) References Cited

U.S. PATENT DOCUMENTS

| | | | |
|---|---|---|---|
| 2003/0226633 A1* | 12/2003 | Muramoto | B32B 37/10 156/145 |
| 2004/0095546 A1 | 5/2004 | Lee et al. | |
| 2006/0146033 A1 | 7/2006 | Chen et al. | |
| 2006/0157192 A1 | 7/2006 | Hasegawa et al. | |
| 2008/0047651 A1* | 2/2008 | Park | B30B 1/34 156/60 |
| 2008/0062140 A1* | 3/2008 | Hotelling | G09G 3/3648 345/173 |
| 2009/0283300 A1 | 11/2009 | Grunthaner | |
| 2014/0123863 A1 | 5/2014 | Tian et al. | |

FOREIGN PATENT DOCUMENTS

| | | |
|---|---|---|
| CN | 101144926 | 3/2008 |
| CN | 101158767 A | 4/2008 |
| CN | 101393338 A | 3/2009 |
| CN | 101581995 A | 11/2009 |
| CN | 102981289 A | 3/2013 |
| DE | 4233079 | 4/1993 |
| DE | 4240819 | 6/1994 |
| JP | 09-281458 A | 10/1997 |
| KR | 20080019138 | 3/2008 |
| WO | WO 85/02583 A1 | 6/1985 |
| WO | 9013425 | 11/1990 |

OTHER PUBLICATIONS

Office Action for Korean Patent Application No. KR 10-2015-7035591, Jan. 19, 2017, 10 Pages, (With Concise Explanation of Relevance).

Office Action for Chinese Patent Application No. CN 201380077558.3, Jun. 27, 2017, 28 Pages (With English Translation).

Notification of Reason for Refusal for Korean Patent Application No. KR 10-2015-7035591, Jul. 31, 2017, 13 Pages (With English Translation).

* cited by examiner

I### PRESSURE-SENSING STAGES FOR LAMINATION SYSTEMS

This application is a 371 of PCT/US13/61031, filed on Sep. 20, 2013.

BACKGROUND

This relates generally to assembly systems, and more particularly, to lamination systems for electronic devices with displays.

Electronic devices such as portable computers and cellular telephones are often provided with displays. Displays are formed from multiple display layers such as a cover glass layer for protecting the display and internal components, a touch screen panel for gathering touch input from a user, and a stack of liquid crystal display (LCD) structures that generate display images. The display layers are commonly laminated together using adhesive.

If care is not taken, defects such as air bubbles can sometimes form in the display or sensitive display components can be damaged during lamination operations. Defects or damage of this type can negatively affect the visual performance and robustness of the display.

It would therefore be desirable to be able to provide improved lamination systems for electronic devices with displays.

SUMMARY

A system may be provided for laminating together two or more structures such as rigid structures while minimizing defects generated by the lamination process. The rigid structures to be laminated together may include display layers for a display. The rigid structures may be display layers for an electronic device display such as a transparent cover layer, a touch-sensitive layer, and a liquid crystal display cell. Adhesive sheets such as sheets of optically clear adhesive can be used to laminate the substrates together. The optically clear adhesive may be an optically clear ultraviolet-light-curable adhesive.

The system may include hard-to-hard lamination equipment for laminating together first and second rigid structures. The system may include soft-to-hard lamination equipment for laminating a soft material to a rigid substrate. For example, the hard-to-hard lamination equipment may be used to attach a sensor-on-cover-glass (CGS) assembly that includes a glass cover layer and a touch-sensitive layer to a display cell such as a liquid crystal display cell.

The hard-to-hard lamination equipment may include first and second mounting stages to which first and second rigid structures can be secured prior to lamination of the two structures. In order to minimize potential defects such as air bubbles between the substrates and to minimize the risk of damage to the substrates during lamination operations, one or both of the mounting stages may be provided with pressure sensors that monitor the pressure and uniformity of pressure with which the first and second structures are pressed together during lamination operations. Actuating equipment that is coupled to the first and/or second stages may position the stages based on gathered pressure data from the pressure sensors.

Further features of the invention, its nature and various advantages will be more apparent from the accompanying drawings and the following detailed description of the preferred embodiments.

DETAILED DESCRIPTION

Electronic devices may include displays. The displays may be used to display images to a user. An illustrative electronic device that may be provided with a display is shown in FIG. 1.

Figure 1:
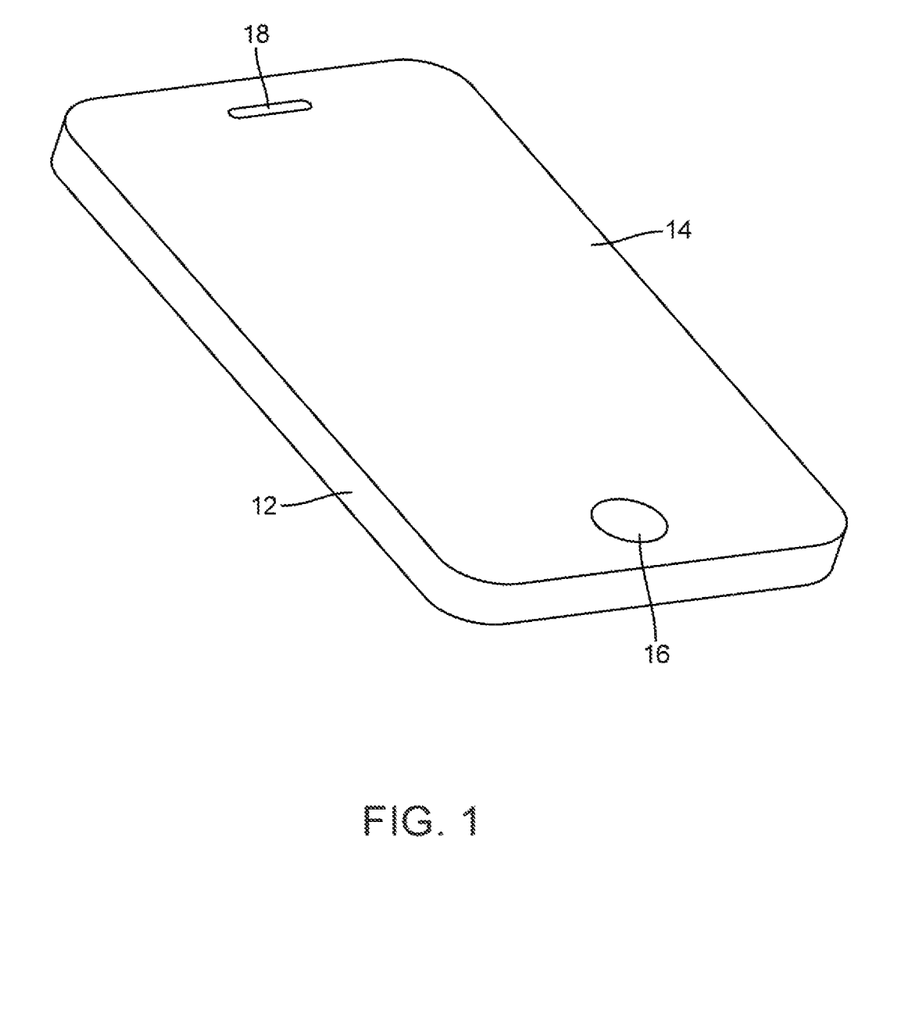
FIG. 1 is a perspective view of an illustrative electronic device with a display in accordance with an embodiment of the present invention.

As shown in FIG. 1, electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 16. Openings may also be formed in a display cover layer or other display layer to accommodate a speaker port such as port 18.

The illustrative configuration for device 10 of FIG. 1 is merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Display 14 may be a touch-sensitive display that includes a touch sensor layer or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components formed on a touch-sensor substrate.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent member.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 2:
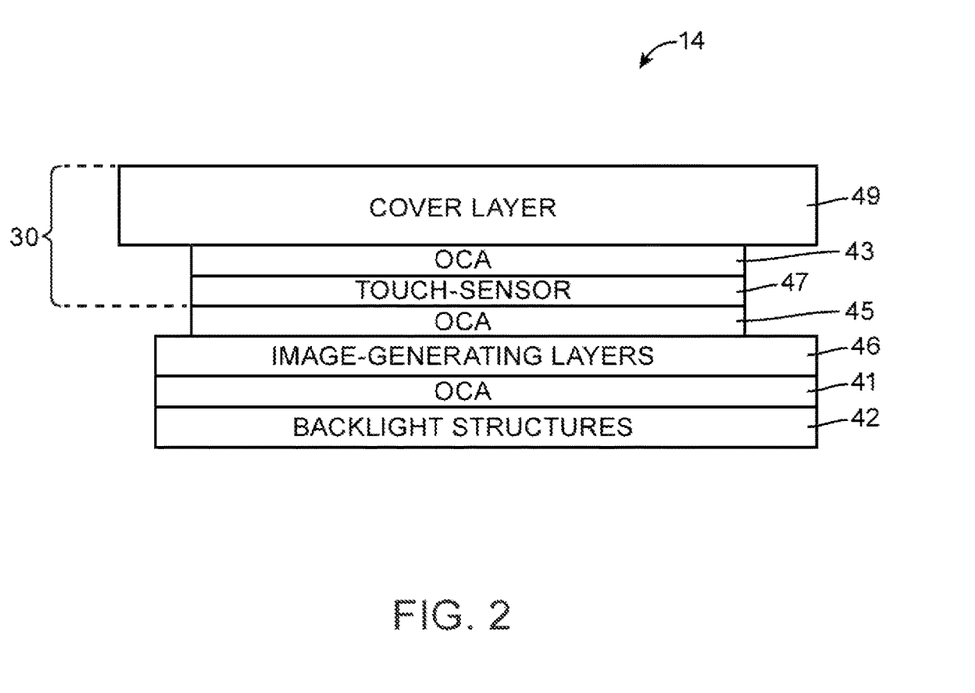
FIG. 2 is a cross-sectional side view of an illustrative display in accordance with an embodiment of the present invention.

A cross-sectional side view of an illustrative configuration that may be used for display 14 of device 10 is shown in FIG. 2. As shown in FIG. 2, display 14 may include one or more layers of touch-sensitive components such as touch-sensitive layers 47 that are attached to a cover layer such as cover layer 49. Cover layer 49 may be formed from a sheet of rigid or flexible transparent material such as glass or plastic.

Touch-sensitive layers 47 may be attached to cover layer 49 using an adhesive material such as optically clear adhesive (OCA) 43. Optically clear adhesive 43 may be formed from a sheet of compliant light-curable adhesive such as ultraviolet light-curable adhesive, a sheet of pressure-sensitive adhesive or other suitable adhesive material. Touch-sensitive layers 47 may include touch sensor components such as an array of capacitive touch sensor electrodes formed from transparent materials such as indium tin oxide formed on a glass or polymer substrate.

Display 14 may include display layers such as image-generating layers 46 (e.g., a liquid crystal display cell) for generating images to be displayed on display 14. Image-generating layers 46 may include polarizer layers, color filter layers, transistor layers, adhesive layers, layers of liquid crystal material, or other layers for generating display images. Image-generating layers 46 may be attached to touch-sensitive layer 47 using adhesive such as optically clear adhesive 45. Optically clear adhesive 45 may be formed from a sheet of compliant light-curable adhesive such as ultraviolet light-curable adhesive, a sheet of pressure-sensitive adhesive or other suitable adhesive material.

Image-generating layers 46 may use light generated by light-generating structures such as backlight structures 42 to form images to be viewed by a user of device 10. Backlight structures 42 may include light-generating components such as light-emitting diodes, light guiding structures, reflective structures, optical films, etc. Backlight structures 42 may be laminated to image-generating layers 46 using an optically clear adhesive such as optically clear adhesive 41, may be attached to image-generating layers 46 using mechanical attachment members or may be mounted adjacent to layers 46 by attaching backlight structures 42 to one or more structural members in device 10.

During assembly operations for display 14, an assembly system may be used to laminate touch-sensitive layer 47 to cover layer 49 using adhesive layer 43 to form a sensor-on-cover-layer display assembly such as sensor-on-cover-glass (CGS) member 30 (sometimes referred to as a sensor-on-glass assembly, an assembly, or a substrate). The assembly system may then be used to laminate adhesive 45 to touch-sensitive layer 47 prior to laminating image-generating layers 46 to CGS member 30 using adhesive 45.

Figure 3:
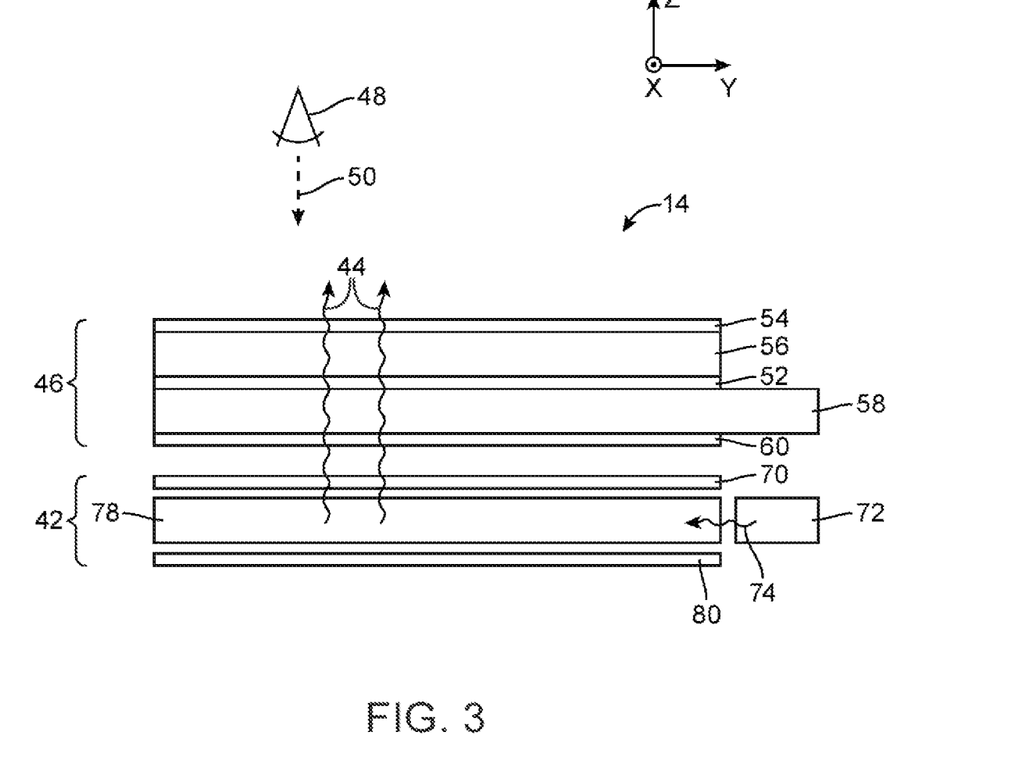
FIG. 3 is a cross-sectional side view of illustrative display layers and backlight structures in accordance with an embodiment of the present invention.

A cross-sectional side view of an illustrative configuration that may be used for image-generating layers 46 and backlight structures 42 of display 14 (e.g., for display layers 46 and backlight structures 42 of the display of FIG. 2, or other suitable display) is shown in FIG. 3. As shown in FIG. 3, display 14 may include backlight structures such as backlight unit 42 for producing backlight 44. During operation, backlight 44 travels outwards (vertically upwards in dimension Z in the orientation of FIG. 3) and passes through display pixel structures in layers 46. This illuminates any images that are being produced by the display pixels for viewing by a user. For example, backlight 44 may illuminate images on image-generating layers 46 that are being viewed by viewer 48 in direction 50.

Image-generating layers 46 may be mounted in chassis structures such as a plastic chassis structure and/or a metal chassis structure to form a display module such as a liquid crystal display cell for attaching to touch-sensitive layer 47. Layers 46 may form a liquid crystal display or may be used in forming displays of other types.

In a configuration in which layers 46 are used in forming a liquid crystal display, layers 46 may include a liquid crystal layer such as liquid crystal layer 52. Liquid crystal layer 52 may be sandwiched between display layers such as layers 58 and 56. Layers 56 and 58 may be interposed between lower polarizer layer 60 and upper polarizer layer 54. If desired, upper polarizer layer 54 may be attached to an outer cover layer such as cover layer 49 or to a touch-sensor layer such as touch-sensor (FIG. 2).

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

Backlight structures 42 may include a backlight light guide plate such as light guide plate 78. Light guide plate 78 may be formed from a transparent material such as clear glass or plastic. During operation of backlight structures 42, a light source such as light source 72 may generate light 74 that is injected into an edge of light guide plate 78. Light source 72 may be, for example, an array of light-emitting diodes.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

Figure 4:
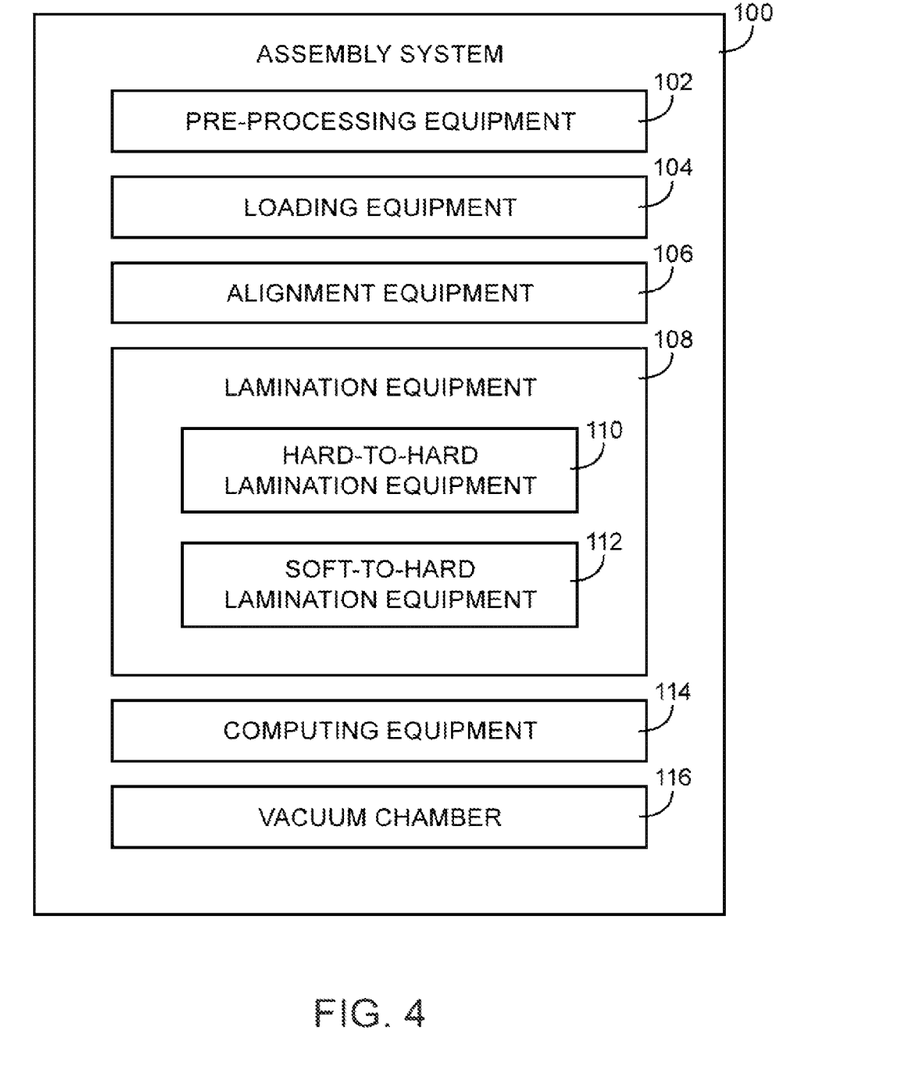
FIG. 4 is a diagram of an illustrative assembly system having lamination equipment in accordance with an embodiment of the present invention.

Backlight structures 42 may include optical films 70 such as diffuser layers for helping to homogenize backlight 44, compensation films for enhancing off-axis viewing, and brightness enhancement films (also sometimes referred to as turning films) for collimating backlight 44. FIG. 4 is a diagram of an illustrative assembly system that may be used for laminating together rigid structures or other substrates such as display layers for display 14. During assembly operations for display 14 of device 10, a manufacturing system such as assembly system 100 may be used to assemble image-generating layers 46, cover layer 49, touch sensor 47, and, if desired, backlight unit 42 to form display 14.

As shown in FIG. 4, assembly system 100 may include pre-processing equipment 102. Pre-processing equipment 102 may be used to clean a substrate prior to lamination, remove protective films from a substrate prior to lamination or otherwise pre-process one or more rigid or flexible substrates prior to lamination operations.

System 100 may include lamination equipment 108 such as hard-to-hard lamination equipment 110 and soft-to-hard lamination equipment 112. Hard-to-hard lamination equipment 110 may be used to laminate together two rigid structures such as image-generating layers 46 and sensor-on-glass assembly 30. Soft-to-hard lamination equipment 112 may be used to attach a soft substrate such as a sheet of optically clear light-curing adhesive onto a rigid substrate such as sensor-on-glass assembly 30. System 100 may include an evacuated portion such as vacuum chamber 116. Some or all of lamination equipment 108 may be formed within vacuum chamber 116 so that the risk of defects such as air bubbles may be further reduced during lamination operations.

System 100 may include other equipment such as loading equipment 104 and alignment equipment 106 for positioning substrates in lamination equipment 108. System 100 may also include computing equipment 114 for controlling lamination equipment 108, loading equipment 104, alignment equipment 106, and pre-processing equipment 102 during lamination operations.

Figure 5:
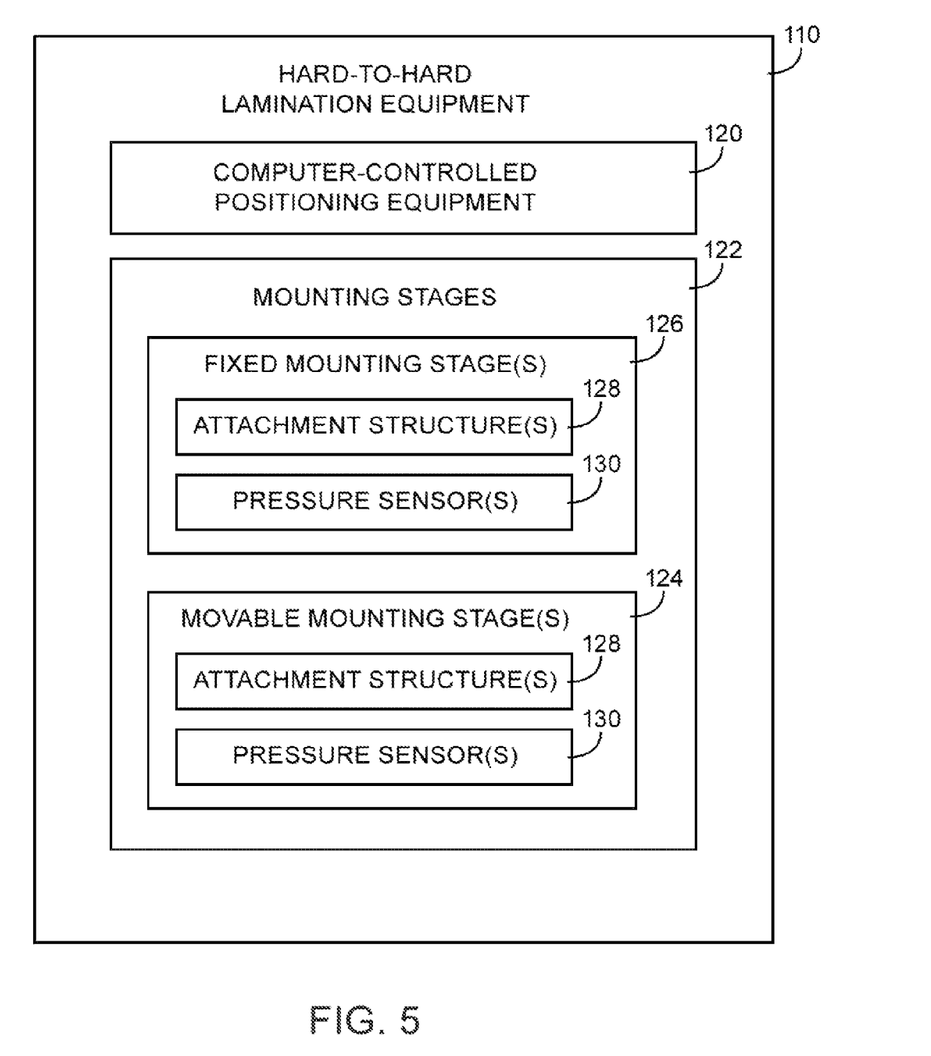
FIG. 5 is a diagram of illustrative hard-to-hard lamination equipment of an assembly system of the type shown in FIG. 4 in accordance with an embodiment of the present invention.

FIG. 5 is a diagram of hard-to-hard lamination equipment 110 of the type that may be used in system such as system 100 of FIG. 4. As shown in FIG. 5, hard-to-hard (HTH) lamination equipment 110 may include one or more mounting stages 122. Structures such as hard substrates or assemblies of hard substrates (e.g., a sensor-on-glass assembly and a display cell such as a liquid crystal display cell for an electronic device display) may be mounted on mounting stages 122 during assembly operations for attaching the structures together.

Mounting stages 122 may include movable mounting stages 124 and fixed mounting stages 126. Computer-controlled positioning equipment 120 may be used in moving and positioning movable mounting stages 124 during assembly operations. Computer-controlled positioning equipment 120 may be controlled by computing equipment 114 during assembly operations.

Fixed mounting stages 126 and movable mounting stages 124 of hard-to-hard lamination equipment 110 may each include one or more attachment structures 128. Fixed mounting stages 126 and movable mounting stages 124 of hard-to-hard lamination equipment 110 may respectively be fixed pressure-sensing lamination stages and movable pressure-sensing lamination stages that include one or more pressure sensors 130.

Attachment structures 128 may include mechanical attachment structures such as clips, clamps, or other mechanical attachment members, vacuum pressure attachment members, electrostatic chuck attachment members or other attachment members for temporarily securing a rigid structure to the mounting stage during lamination operations.

Pressure sensors 130 may include capacitive pressure sensors, piezoelectric pressure sensors, microelectromechanical systems (MEMS) based pressure sensors, pressure transducers, silicon-based pressure sensors, strain gauges, capacitive pressure sensors, optical pressure sensors, inductive pressure sensors or pressure sensors implemented using other suitable pressure sensing technology.

Mounting stages 124 and/or 126 may include pressure sensors 130 that are mounted on a surface of the mounting stage so that the pressure sensor directly contacts a structure to be laminated and/or pressure sensors 130 that are embedded or partially embedded within portions of a mounting stage. Pressures sensors 130 may be formed at discrete locations on a mounting stage or may form a pressure sensing layer of a mounting stage that extends across all or substantially all of a mounting stage.

Figure 6:
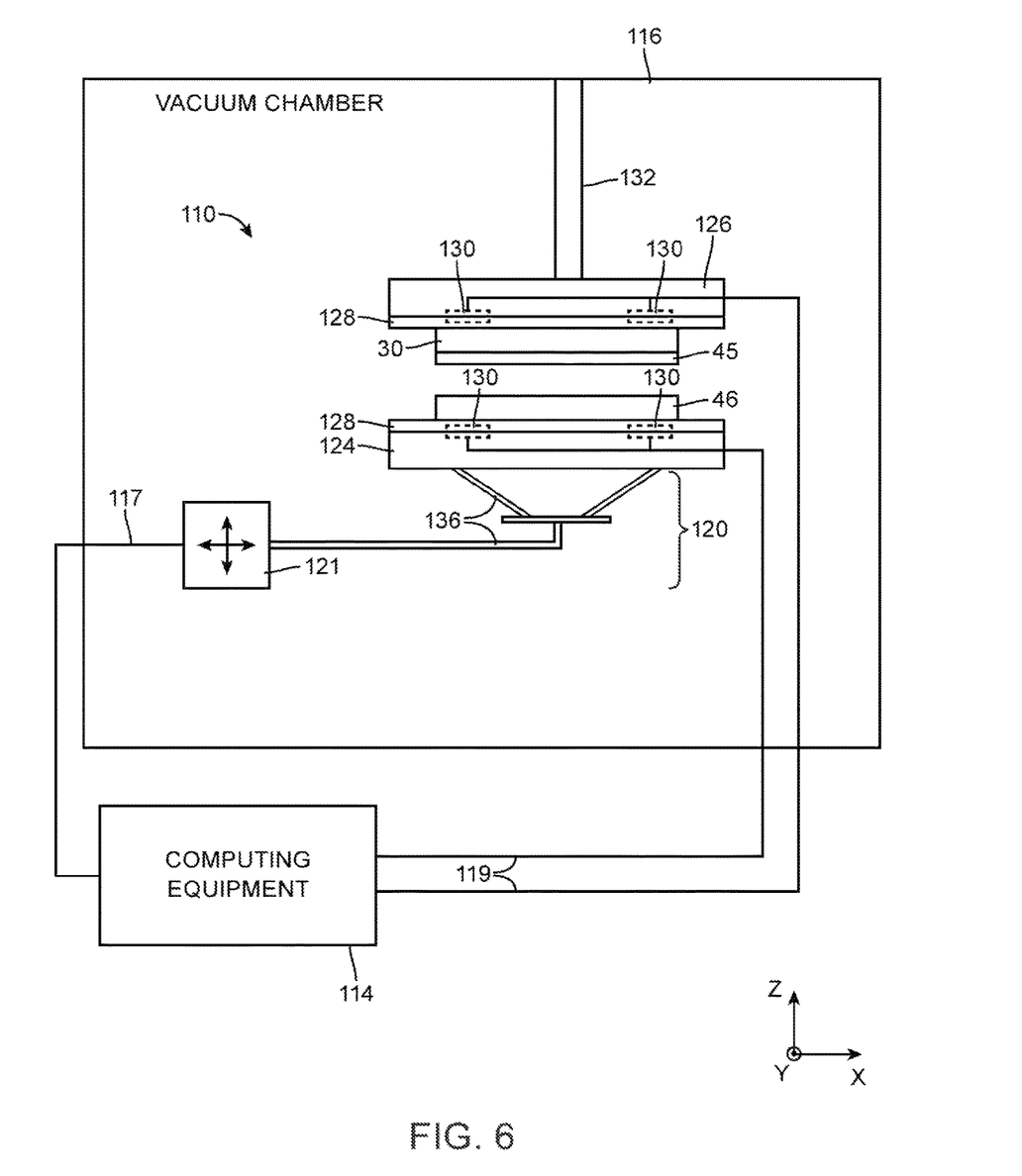
FIG. 6 is a diagram of illustrative hard-to-hard lamination equipment showing how first and second rigid structures may be temporarily attached to respective first and second mounting stages having pressure sensing layers during assembly operations in accordance with an embodiment of the present invention.

FIG. 6 is a diagram of hard-to-hard lamination equipment 110 inside vacuum chamber 116 during hard-to-hard lamination operations. Vacuum chamber 116 may be formed from an enclosure that has been evacuated of all or nearly all air and other gasses. As shown in FIG. 6, a rigid structure such as sensor-on-glass assembly 30 may be temporarily attached to fixed mounting stage 126.

Stage 126 may include an attachment member 128 such as an electrostatic chuck that clamps assembly 30 onto stage 126. In configurations in which attachment member 128 is implemented as an electrostatic chuck (sometimes referred to as an e-chuck), member 128 may use electromagnetic fields generated in the chuck to electrostatically hold substrate 30 in a fixed position during lamination operations. However, this is merely illustrative. If desired, member 128 may be any suitable attachment member for attaching a structure such as member 30 to stage 126.

CGS member 30 may be provided with a layer of adhesive such as optically clear adhesive 45 to be used in attaching an additional rigid structure such as display cell 46 to member 30. Adhesive 45 may be a sheet of optically clear adhesive material that has been attached to member 30 using soft-to-hard lamination equipment 112 (as an example).

An additional rigid structure such as display cell 46 may be temporarily attached to a movable stage such as movable stage 124. Movable stage 124 may be rotated, turned, moved laterally or otherwise moved using computer-controlled positioning equipment 120 during lamination operations.

Movable mounting stage 124 may include one or more pressure sensors 130. Sensors 130 may be mounted on a surface of stage 124 (e.g., so that the pressure sensor directly contacts display cell 46) and/or embedded or partially embedded within portions of mounting stage 124. Pressures sensors 130 may be formed at discrete locations on mounting stage 124 (as in the example of FIG. 6) or a sensor 130 may form a pressure sensing layer of mounting stage 124 that extends across all or substantially all of mounting stage 124.

Fixed mounting stage 126 may also, if desired, include one or more pressure sensors 130. Sensors 130 may be mounted on a surface of stage 126 (e.g., so that the pressure sensor directly contacts member 30) and/or embedded or partially embedded within portions of mounting stage 126. Pressures sensors 130 may be formed at discrete locations on mounting stage 126 (as in the example of FIG. 6) or a sensor 130 may form a pressure sensing layer of mounting stage 126 that extends across all or substantially all of mounting stage 126.

During lamination operations, computing equipment 114 may transmit signals over path 117 (e.g., a wired or wireless connection) to computer-controlled positioning equipment 120. Computer-controlled positioning equipment 120 may include one or more motors, levers, pistons such as hydraulic pistons, posts, platforms, or other equipment for moving, rotating, turning, sliding or otherwise positioning stage 124.

Computer-controlled positioning equipment 120 may include positioner 121 and support structures such as structures 136 that are attached between stage 124 and positioner 121. Fixed mounting stage 126 may be attached to a portion of vacuum chamber 116 using structural member 132 or may be otherwise secured in a fixed position within chamber 116. Signals from computing equipment 114 may instruct equipment 120 to move movable stage 124 laterally (i.e., in the x-y plane of FIG. 6), vertically (i.e., in the positive or negative z-direction of FIG. 6), or to rotate stage 124 (e.g., rotate stage 124 in the x-y plane or out of the x-y plane of FIG. 6).

For example, computing equipment 114 may instruct equipment 121 to move stage 124 laterally to align display cell 46 with member 30 and then vertically until display cell 46 contacts adhesive layer 45 on member 30.

During lamination operations, computing equipment 114 may receive pressure signals over paths 119 (e.g., wired or wireless connections between sensors 130 and computing equipment 114) from pressure sensors 130 of stage 124 and/or stage 126. The pressure signals from sensors 130 may be proportional to the amount of pressure being applied to one or both of display cell 46 and member 30 at the position of the pressure sensor while the display cell is pressed against member 30 using movable stage 124. Computing equipment 114 may convert the pressure signals in to pressure data and compare the pressure data with known target pressures for safe lamination of structures 46 and 30. The known target pressures may include absolute pressure ranges in which structures 30 and 46 can be safely laminated without damaging structure 30 or 46 and/or relative pressures that indicate that pressure is being evenly (uniformly) applied across structures 30 and 46 during lamination operations.

Computing equipment 114 may instruct positioning equipment 120 to press display cell 46 against member 30 while adjusting the position and orientation of movable stage 124 based on the comparison of the pressure data from pressure sensors 130 with the known target pressures.

Figure 7:
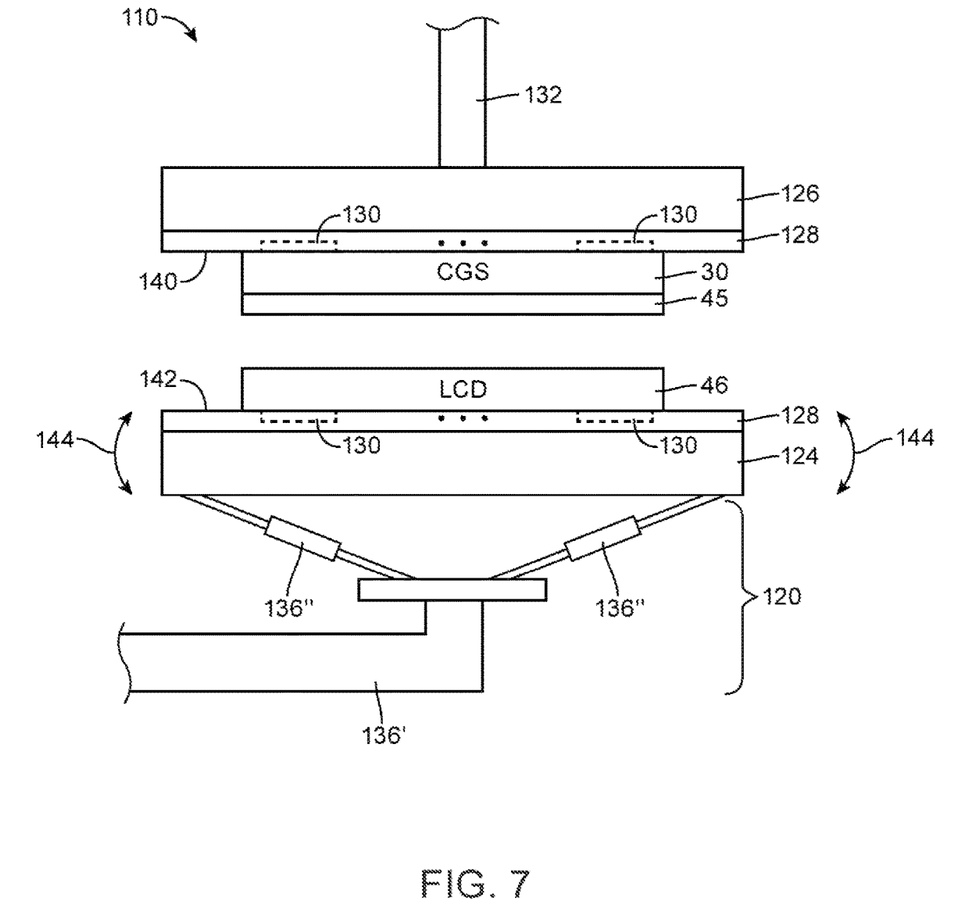
FIG. 7 is a diagram of illustrative pressure-sensing lamination stages showing how pressure sensors on a stage may be formed at a surface of the stage in accordance with an embodiment of the present invention.
Figure 8:
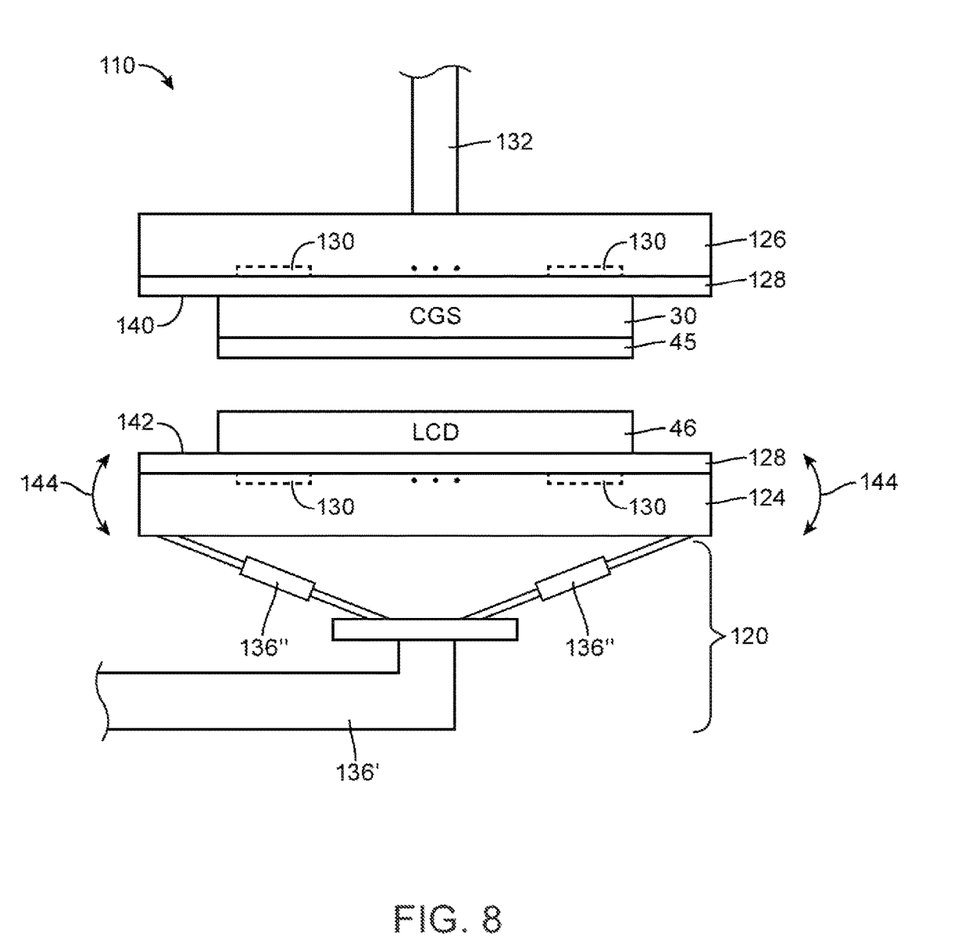
FIG. 8 is a perspective view of illustrative pressure-sensing lamination stages showing how pressure sensors on a stage may be embedded within the stage in accordance with an embodiment of the present invention.

FIGS. 7 and 8 show examples of locations at which pressure sensors 130 may be located on or within mounting stages 124 and/or 126.

As shown in FIG. 7, pressure sensors 130 of movable mounting stage 124 may have an outer surface that is formed in a common plane with surface 142 of stage 124. In this way, pressure sensors 130 may be in contact with a structure to be laminated such as display cell 46. Surface 142 of stage 124 may be a surface of attachment member 128 or any other surface of stage 124 that contacts display cell 46 during lamination operations.

Pressure sensors 130 of fixed mounting stage 126 may have an outer surface that is formed in a common plane with surface 140 of stage 126. In this way, pressure sensors 130 may be in contact with an additional structure to be laminated such as CGS member 30. Surface 140 of stage 126 may be a surface of attachment member 128 or any other surface of stage 126 that contacts member 30 during lamination operations.

As shown in FIG. 8, pressure sensors 130 of movable mounting stage 124 may be embedded within stage 124. In the example of FIG. 8, sensors 130 are mounted behind attachment member 128 of stage 124. However, this is merely illustrative. If desired, sensors 130 may be wholly or partially embedded within attachment member 128 and/or wholly or partially embedded within other portions of stage 124.

Pressure sensors 130 of fixed mounting stage 126 may be mounted behind attachment member 128 of stage 126. However, this is merely illustrative. If desired, sensors 130 may be wholly or partially embedded within attachment member 128 and/or wholly or partially embedded within other portions of stage 126.

In the examples of FIGS. 7 and 8, computer-controlled positioning equipment 120 includes a first support structure 136' (e.g., a support structure coupled to positioner 121) and actuating support structures such as hydraulic actuators 136". Actuators 136" may be controlled by computing equipment 114 to rotate stage 124 as indicated by arrows 144 (as examples). However, positioning equipment 120 of FIGS. 7 and 8 is merely illustrative. If desired, positioning equipment 120 may include any suitable arrangement of actuating members and support members for laterally, vertically, or rotationally moving stage 124 during lamination operations.

The examples of FIGS. 6, 7, and 8 in which hard-to-hard lamination equipment 110 is used to laminate a sensor-on-glass assembly for an electronic device display to a display cell such as a liquid crystal display cell for the device are merely illustrative. If desired, hard-to-hard lamination equipment 110 having one or more pressure-sensing lamination stages may be used to laminate any rigid structure or substrate to any other suitable rigid substrate or substrate.

Figure 9:
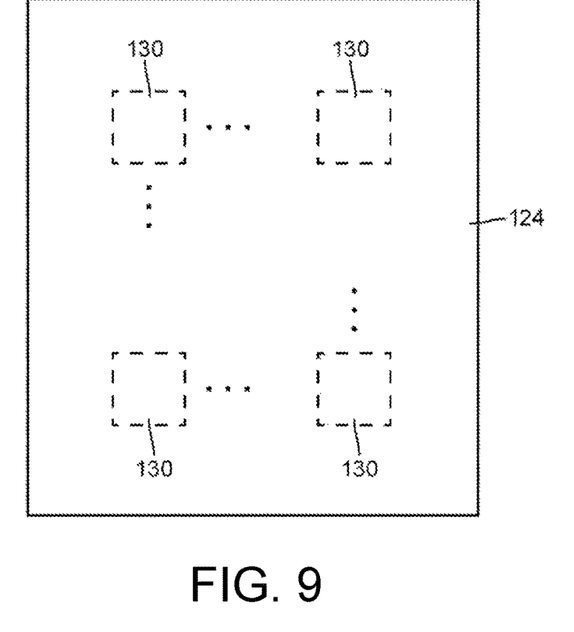
FIG. 9 is a top view of an illustrative pressure-sensing lamination stage showing how pressure sensors may be formed at discrete locations on the stage in accordance with an embodiment of the present invention.

FIG. 9 is a top view of movable mounting stage 124 showing how, in one suitable configuration, one or more pressure sensors 130 may be distributed laterally across mounting stage 124. Stage 124 may include one pressure sensor, two pressure sensors, three pressure sensors, four pressure sensors, more than four pressure sensors, ten pressure sensors or any suitable number of pressure sensors for determining the absolute and relative pressures applied to structures to be laminated using stage 124.

Pressure sensors 130 in a fixed mounting stage such as fixed mounting stage 126 of FIGS. 7 and 8 may similarly include one or more pressure sensors distributed laterally across mounting stage 126.

Figure 10:
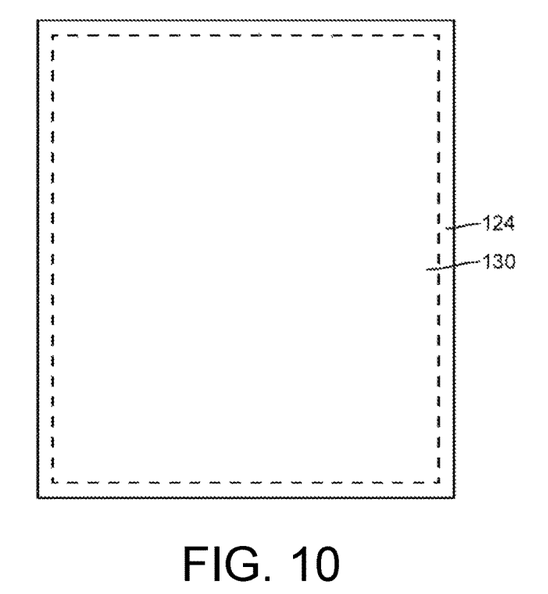
FIG. 10 is a top view of an illustrative pressure-sensing lamination stage showing how a pressure sensor may be formed from a pressure sensing layer that extends across substantially all of the stage in accordance with an embodiment of the present invention.

FIG. 10 is a top view of movable mounting stage 124 showing how, in another suitable configuration, a single pressure sensor 130 may extend across substantially all of mounting stage 124. An extended pressure sensor of the type shown in FIG. 9 may be a segmented pressure sensor having multiple pressure sensing regions for sensing relative pressure differences, may be a monolithic pressure sensor that senses a single pressure, or may be a layer of pressure sensor elements (e.g., an array of pressure sensing elements) on a surface of stage 124 or embedded within stage 124.

Pressure sensors 130 in a fixed mounting stage such as fixed mounting stage 126 of FIGS. 7 and 8 may similarly include a single pressure sensor 130 that extends across substantially all of mounting stage 126, if desired.

Figure 11:
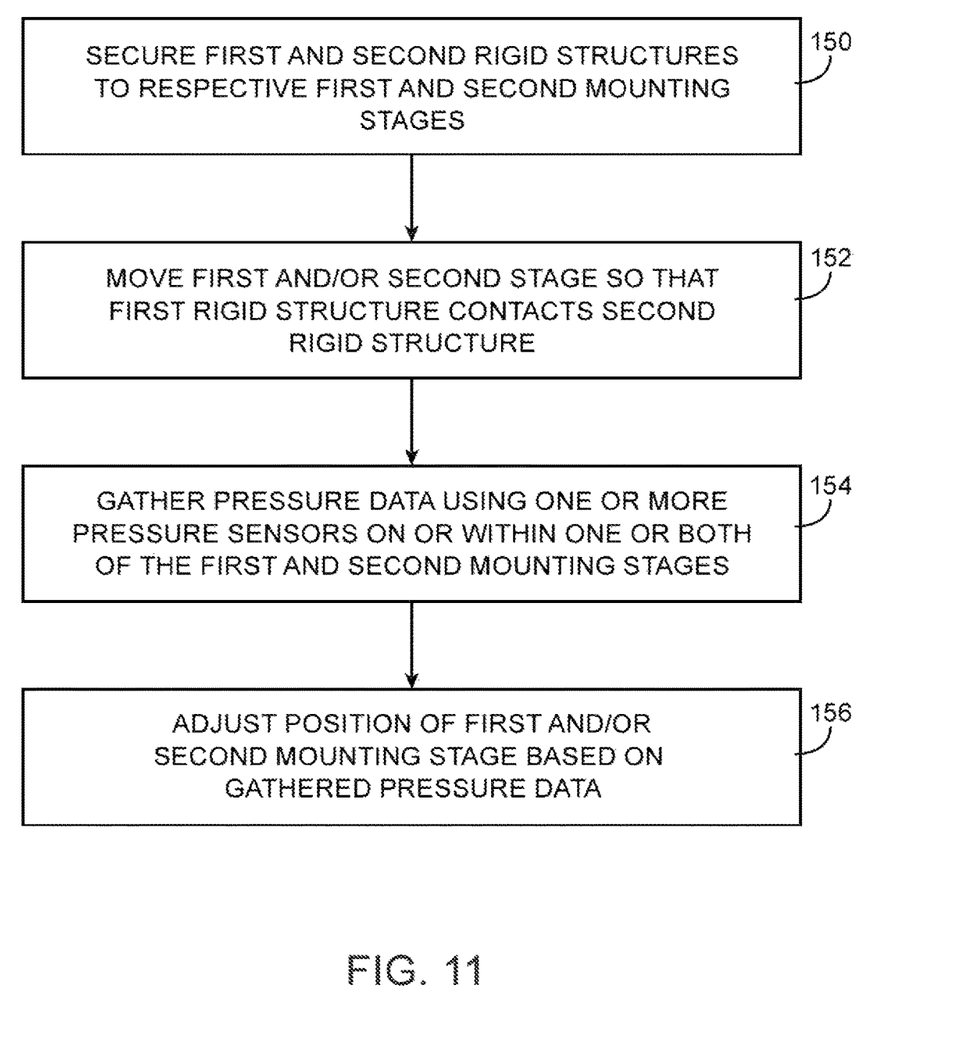
FIG. 11 is a flow chart of illustrative steps involved in laminating a first rigid structure to a second rigid structure using an assembly system having pressure-sensing lamination stages in accordance with an embodiment of the present invention.

Illustrative steps that may be used to laminate together first and second rigid structures using a pressure-sensing lamination stage of the type shown in FIGS. 5, 6, 7, 8, 9, and 10 are shown in FIG. 11.

At step 150, a first rigid structure such as an assembly of substrates or other rigid structures (e.g., sensor-on-cover-glass assembly 30 or other display assembly or rigid substrate) may be (temporarily) attached to a corresponding first mounting stage such as fixed mounting stage 126. A second rigid structure such as an assembly of substrates or other rigid structures (e.g., electronic device display cell 46) may be (temporarily) attached to a corresponding second mounting stage such as movable mounting stage 124. The first and second mounting stages may include each include attachment members such as an electrostatic chuck for attaching the rigid structures to the corresponding stage. One or more of the first and second mounting stages may be a pressure-sensing mounting stage having one or more pressure sensors such as sensors 130.

At step 152, the first and/or second mounting stage (e.g., the movable mounting stage) may be moved so that the first rigid structure contacts the second rigid structure. Computer-controlled positioning equipment such as equipment 120 may be used to move the movable mounting stage.

At step 154, computing equipment such as computing equipment 114 may gather pressure data using the one or more pressure sensors on or within one or both of the first and second mounting stages. Gathering the pressure data may include receiving pressure signals from the pressure sensors and converting the pressure signals into absolute pressure data from each sensor and/or relative pressure data between multiple sensors.

At step 156, the position of one or both of the first and second mounting stages (e.g., movable stage 124) may be adjusted based on the gathered pressure data. Adjusting the position of the movable mounting stage based on the gathered pressure data may include comparing the gathered pressure data with known target pressures for safe lamination of the first and second rigid structures and/or comparing gathered pressure data from multiple pressure sensors. The known target pressures may include absolute pressure ranges in which the structures can be safely laminated without damaging the structures.

Comparing the gathered pressure data between multiple sensors may include comparing relative pressures that indicate whether pressure is being evenly (uniformly) applied across the structures during lamination operations. Adjusting the position of the movable mounting stage based on the gathered pressure data may include adjusting the position and/or orientation of the movable stage based on the comparison of the pressure data from the pressure sensors with the known target pressures and/or the comparison of the gathered pressure data from multiple sensors.

In accordance with an embodiment a lamination system is provided for laminating a first structure to a second structure, the system including a mounting stage for mounting the first structure, a movable mounting stage for mounting the second structure, where the movable mounting stage includes at least one pressure sensor, and computing equipment coupled to the movable mounting stage and the at least one pressure sensor, where the computing equipment gathers pressure data associated with pressures on the second structure using the at least one pressure sensor.

In accordance with another embodiment, the at least one pressure sensor is has an outer surface that is formed in a common plane with a surface of the movable mounting stage.

In accordance with another embodiment, the at least one pressure sensor is embedded within the movable mounting stage.

In accordance with another embodiment, the lamination system also includes computer-controlled positioning equipment, where the computing equipment is configured to adjust a position of the movable mounting stage using the computer-controlled positioning equipment based on the gathered pressure data.

In accordance with another embodiment, the at least one pressure sensor includes at least first and second pressure sensors mounted at discrete locations on the movable mounting stage.

In accordance with another embodiment, the at least one pressure sensor includes pressure sensing layer of the movable mounting stage.

In accordance with another embodiment, the mounting stage for mounting the first structure includes a fixed mounting stage for mounting a display assembly for an electronic device display.

In accordance with another embodiment, the movable mounting stage for mounting the second structure includes a movable mounting stage for mounting a liquid crystal display cell to be laminated to the display assembly.

In accordance with another embodiment, the fixed mounting stage includes an electrostatic chuck that secures the display assembly in a fixed position.

In accordance with another embodiment, the lamination system also includes a vacuum chamber, where the fixed mounting stage and the movable mounting stage are mounted within the vacuum chamber.

In accordance with an embodiment, a method of laminating a first rigid structure to a second rigid structure using hard-to-hard lamination equipment having a first stage and a second stage, where the second stage is a pressure-sensing stage having a plurality of pressure sensors is provided, the method including temporarily attaching the first rigid structure to the first stage, temporarily attaching the second rigid structure to the pressure-sensing stage, gathering pressure data using the plurality of pressure sensors, and laminating the first rigid structure to the second rigid structure by positioning the pressure-sensing stage based on the gathered pressure data.

In accordance with another embodiment, the method also includes, before gathering the pressure data using the plurality of pressure sensors, moving the pressure-sensing stage so that the first rigid structure contacts the second rigid structure.

In accordance with another embodiment, gathering the pressure data using the plurality of pressure sensors includes gathering absolute pressure data corresponding to a pressure with which the first rigid structure is pressed against the second rigid structure.

In accordance with another embodiment, gathering the pressure data using the plurality of pressure sensors includes gathering relative pressure data corresponding to a uniformity of pressure with which the first rigid structure is pressed against the second rigid structure.

In accordance with another embodiment, laminating the first rigid structure to the second rigid structure by positioning the pressure-sensing stage based on the gathered pressure data includes comparing the gathered pressure data to target pressure data.

In accordance with another embodiment, laminating the first rigid structure to the second rigid structure by positioning the pressure-sensing stage based on the gathered pressure data further includes modifying the position of the pressure-sensing stage based on the comparison of the gathered pressure data to the target pressure data.

In accordance with an embodiment, a method of using a laminating system to attach a liquid crystal display cell to an assembly that includes a glass layer, a touch-sensor substrate attached to the glass layer, and a sheet of optically clear adhesive on the touch-sensor substrate is provided, the method including securing the assembly in a fixed position, securing the liquid crystal display cell to a movable pressure-sensing mounting stage, gathering pressure data using the movable pressure-sensing mounting stage, and pressing the liquid crystal display cell against the sheet of optically clear adhesive material while gathering the pressure data using the movable pressure-sensing mounting stage.

In accordance with another embodiment, gathering the pressure data using the movable pressure-sensing mounting stage includes generating pressure signals using pressure sensors on the movable pressure-sensing mounting stage and generating the pressure data from the pressure signals.

In accordance with another embodiment, the method also includes adjusting an orientation of the movable pressure-sensing mounting stage based on the gathered pressure data.

In accordance with another embodiment, securing the assembly in the fixed position includes temporarily attaching the assembly to a fixed pressure-sensing mounting stage.

The foregoing is merely illustrative of the principles of this invention and various modifications can be made by those skilled in the art without departing from the scope and spirit of the invention.

What is claimed is:

1. A lamination system for laminating a first structure to a second structure, the system comprising:
   a mounting stage for mounting the first structure;
   a movable mounting stage for mounting the second structure, wherein the movable mounting stage includes at least one pressure sensor, the at least one pressure sensor monitoring an uniformity of pressure with which the first structure and the second structure are pressed together during lamination operations;
   a positioner configured to move the movable mounting stage at least laterally or vertically relative to the mounting stage so that the first structure and the second structure come in contact;
   actuators between the positioner and the movable mounting stage; and
   computing equipment coupled to the movable mounting stage and the at least one pressure sensor, wherein the computing equipment is configured to gather pressure data associated with pressures on the second structure using the at least one pressure sensor,
   wherein the computing equipment is configured to receive pressure signals from the at least one pressure sensor during lamination operations, compare the received pressure signals to target pressures, and responsive to the first structure and the second structure coming into contact operate the actuators based on the received pressure signals so that a uniform pressure is applied across the first structure and the second structure, and
   wherein operation of the actuators cause the movable mounting stage to move laterally or vertically, and rotate in a x-y plane or out of the x-y plane in order to adjust the position and orientation of the movable mounting stage.

2. The lamination system defined in claim 1 wherein the at least one pressure sensor has an outer surface that is formed in a common plane with a surface of the movable mounting stage.

3. The lamination system defined in claim 1 wherein the at least one pressure sensor is embedded within the movable mounting stage.

4. The lamination system defined in claim 1 wherein the actuators are hydraulic actuators.

5. The lamination system defined in claim 1 wherein the at least one pressure sensor comprises at least first and second pressure sensors mounted at discrete locations on the movable mounting stage.

6. The lamination system defined in claim 1 wherein the at least one pressure sensor comprises pressure sensing layer of the movable mounting stage.

7. The lamination system defined in claim 1 wherein the mounting stage for mounting the first structure comprises a fixed mounting stage for mounting a display assembly for an electronic device display.

8. The lamination system defined in claim 7 wherein the movable mounting stage for mounting the second structure comprises a movable mounting stage for mounting a liquid crystal display cell to be laminated to the display assembly.

9. The lamination system defined in claim 8 wherein the fixed mounting stage comprises an electrostatic chuck that secures the display assembly in a fixed position.

10. The lamination system defined in claim 9, further comprising a vacuum chamber, wherein the fixed mounting stage and the movable mounting stage are mounted within the vacuum chamber.

11. A method of laminating a first rigid structure to a second rigid structure using hard-to-hard lamination equipment having a first stage and a second stage, wherein the second stage is a pressure-sensing stage having a plurality of pressure sensors, the method comprising:
   temporarily attaching the first rigid structure to the first stage;
   temporarily attaching the second rigid structure to the pressure-sensing stage;
   operating a positioner to move the second stage relative to the first stage at least laterally or vertically so that the first rigid structure and the second rigid structure come in contact;
   gathering pressure data using the plurality of pressure sensors; and
   operating actuators between the positioner and the second stage based on the gathered pressure data to laminate the first rigid structure to the second rigid structure, wherein the gathering pressure data comprises monitoring an uniformity of pressure with which the first rigid structure and the second rigid structure are pressed together during the laminating the first rigid structure to the second rigid structure, and wherein the operating of actuators comprises moving the pressure-sensing stage laterally or vertically, and rotating the pressure-sensing stage in a x-y plane or out of the x-y plane in order to adjust a position and orientation of the pressure-sensing stage for applying an uniform pressure to the first rigid structure and the second rigid structure.

12. The method defined in claim 11 wherein gathering the pressure data using the plurality of pressure sensors comprises gathering absolute pressure data corresponding to a pressure with which the first rigid structure is pressed against the second rigid structure.

13. The method defined in claim 11 wherein gathering the pressure data using the plurality of pressure sensors comprises gathering relative pressure data corresponding to a uniformity of pressure with which the first rigid structure is pressed against the second rigid structure.

14. The method defined in claim 11 wherein operating the actuators comprises comparing the gathered pressure data to target pressure data.

15. The method defined in claim 14 wherein operating the actuators further comprises modifying the position of the pressure-sensing stage based on the comparison of the gathered pressure data to the target pressure data.

16. A method of using a laminating system to attach a liquid crystal display cell to an assembly that includes a glass layer, a touch-sensor substrate attached to the glass layer, and a sheet of optically clear adhesive on the touch-sensor substrate, the method comprising:

securing the assembly in a fixed position;

securing the liquid crystal display cell to a movable pressure-sensing mounting stage;

operating a positioner to move the movable pressure-sensing mounting stage at least laterally or vertically so that the liquid crystal display cell and the assembly come in contact;

gathering pressure data using the movable pressure-sensing mounting stage; and operating actuators based on the gathered pressure data to press the liquid crystal display cell against the sheet of optically clear adhesive material, wherein the gathering pressure data comprises monitoring an uniformity of pressure with which the assembly and the liquid crystal display cell are pressed together during the pressing the liquid crystal display cell, and wherein operating the actuators comprises moving the movable pressure-sensing mounting stage laterally or vertically, and rotating the movable pressure-sensing mounting stage in a x-y plane or out of the x-y plane in order to adjust a position and orientation of the movable pressure-sensing mounting stage for applying an uniform pressure across the assembly and the liquid crystal display cell.

17. The method defined in claim 16 wherein gathering the pressure data using the movable pressure-sensing mounting stage comprises:

generating pressure signals using pressure sensors on the movable pressure-sensing mounting stage; and generating the pressure data from the pressure signals.

18. The method defined in claim 16, further comprising adjusting an orientation of the movable pressure-sensing mounting stage based on the gathered pressure data.

19. The method defined in claim 16 wherein securing the assembly in the fixed position comprises temporarily attaching the assembly to a fixed pressure-sensing mounting stage.

* * * * *